United States Patent [19]

Mizuno et al.

[11] 4,139,489
[45] Feb. 13, 1979

[54] METHOD FOR RECLAIMING A USED ACTIVE CARBON BY APPLYING ELECTRIC CURRENT DIRECTLY IN PARALLEL FLOW WITH CARBON FLOW

[75] Inventors: Toshio Mizuno; Heiichiro Murakami, both of Iwaki, Japan

[73] Assignee: Kureha Kagaku Kogyo Kabushika Kaisha, Tokyo, Japan

[21] Appl. No.: 758,839

[22] Filed: Jan. 12, 1977

Related U.S. Application Data

[63] Continuation-in-part of Ser. No. 678,959, Apr. 21, 1976, abandoned.

[30] Foreign Application Priority Data

Apr. 21, 1975 [JP] Japan .................................. 50/48301

[51] Int. Cl.² ...................... B01J 21/20; C01B 31/08; H05B 3/62; H05B 31/12
[52] U.S. Cl. .................................. 252/411 R; 13/7; 13/20; 252/420
[58] Field of Search ............... 252/411, 416, 419, 420; 13/7, 20; 201/19; 23/288 J

[56] References Cited

U.S. PATENT DOCUMENTS

| 1,071,442 | 8/1913 | Lee ................................. 13/7 |
| 1,396,718 | 11/1921 | Bachaus ............................ 23/288 J |
| 1,400,959 | 12/1921 | Koetschet ........................ 23/288 J |
| 1,634,478 | 7/1927 | Wickenden et al. ............... 252/421 |
| 1,634,480 | 7/1927 | Wickenden et al. ............... 13/7 |
| 1,863,361 | 6/1932 | Wickenden et al. ............... 13/7 |
| 4,025,610 | 5/1977 | Suzuki et al. ..................... 13/7 |

FOREIGN PATENT DOCUMENTS

| 37-2762 | 1962 | Japan. |
| 43-12424 | 1968 | Japan. |
| 12425 | 1968 | Japan. |

OTHER PUBLICATIONS

Brochure of Kyoritsu Yaki Kogyo Kenekusho entitled – "Unimech CACT C400".

Primary Examiner—P. E. Konopka
Attorney, Agent, or Firm—Lane, Aitken & Ziems

[57] ABSTRACT

A method for continuously reclaiming used active carbon particles by application of an electrical current to electrodes having a plurality of apertures of a defined size and which are vertically spaced in a vertical column through which the used particles flow downwardly, filling the space between the electrodes.

6 Claims, 9 Drawing Figures

METHOD FOR RECLAIMING A USED ACTIVE CARBON BY APPLYING ELECTRIC CURRENT DIRECTLY IN PARALLEL FLOW WITH CARBON FLOW

CROSS-REFERENCE TO RELATED APPLICATION

The present application is a continuation-in-part of our copending application U.S. Ser. No. 678,959, filed Apr. 21, 1976, now abandoned for A METHOD FOR RECLAIMING A USED ACTIVE CARBON.

FIELD OF THE INVENTION

The present invention relates to an advantageous method for reclaiming a used active carbon which includes heating the used active carbon by applying an electric current directly to same.

BACKGROUND OF THE INVENTION

The rejuvenation and reclamation of used active carbon by heating the electrically conductive used active carbon by applying an electric current is disclosed in the prior art. One of these prior art processes employs an electric current directly applied to a quantity of particulate used active carbon accumulated between two vertical electrode plates arranged face-to-face (Accumulation Method). Another method treats the used active carbon by filling a space between two face-to-face vertical electrode plates with downwardly moving particles of the used active carbon and simultaneously applying an electric current to the particles (Moving Layer Method). Still another prior art method is similar to the "Moving Layer Method" but provides additional vertical electrodes arranged in a horizontal plane through which the particles flow (Method Using Plurality of Vertical Electrodes In A Horizontal Plane).

The Accumulation Method has the drawback that only a batch type operation is possible, so that this method is unsuitable for a continuous reclamation of the used active carbon. Another drawback of the accumulation method is that the desorption of the materials adsorbed on the active carbon requires a complicated procedure in which the applied voltage must be controlled in the course of desorption, because the electrical resistance of the individual particles accumulated between the electrodes changes gradually in the course of desorption as the contaminants are desorbed. This Accumulation Method is further limited by the difficulty of establishing a voltage control system capable of coping with the fluctuations in the amount of materials adsorbed on the used active carbon (adsorbed carbon) and in the amount of carbon filling the space between the electrodes.

On the other hand, while the Moving Layer Method is suitable for continuous reclamation of the used active carbon, it has the drawback that the electric current is applied at a right angle to the particle flow and therefore is not uniformly applied to the particles flowing between the electrode plates. This is due to the fact that the electrical resistance of the carbon particles undergoes a change in the course of desorption. Specifically, the apparent electric resistance of the particles in the moving layer of the active carbon containing adsorbed contaminants has a higher value than that of like carbon particles having no adsorbed contaminants and higher than that of the reclaimed active carbon. Therefore, the electrical resistance distribution in the layer formed with the particles of adsorbed carbon between the two vertical electrode plates arranged face-to-face in the column has a higher value near the upper end of the electrode plate than at the lower end. When voltage is applied to the electrode plates, therefore, the current is biased toward the lower end of the electrode plate and therefore is concentrated there. As a result, the heat generation of the particles of adsorbed carbon takes place only near the lower end of the electrode plate. According to this method, the heat generation in the part of the particle-moving layer formed with the particles of adsorbed carbon causes heat transfer to take place in an upper particle-layer adjacent to the lower ends, but the whole of the particle-moving layer constitutes a downward-flowing layer, so that the heat transfer is only produced within a narrow range. Therefore, to obtain a uniform desorption of materials adsorbed on the carbon particles, the length of the electrode plates must be considerably increased to compensate for the inefficient heat transfer. Therefore, the apparatus size must be increased and for this reason, the moving layer method has been criticized as being impractical.

The method for heating used active carbon by providing a plurality of additional vertical electrodes arranged in a horizontal plane of the particle-flowing passage and then applying an electric current to the particles passing between these electrodes, is often effective, when an experimental device small enough to uniformly heat the whole sectional area is used, because the particle-flowing passage has a comparatively narrow sectional area. As previously explained, however, this method has also the defect that the flow of an electric current becomes non-uniform and unstable, as in the case of the particles flowing down between opposing electrode plates.

SUMMARY OF THE INVENTION

Therefore, the object of the present invention is to provide a method for advantageously reclaiming and treating a used active carbon, wherein the used active carbon can continuously be subjected to heat treatment by applying a uniform electric current.

The above object and other objects of the present invention will become clear from the following description.

A method for heating a used active carbon by applying an electric current directly, without the flow of electric current becoming non-uniform, has now been discovered wherein electrodes are horizontally arranged in a vertical column in a spaced relationship and the space between these electrodes is filled with the used active carbon and voltage is applied to the electrodes.

According to the present invention, there is provided a method for reclaiming and treating a used active carbon, which includes introducing the used active carbon into a vertical column containing at least two electrodes mounted in a spaced relationship, the respective electrodes being uniformly provided with a plurality of openings or through-holes large enough for the particles of the used active carbon to pass through, then letting the particles of the used active carbon flow down while filling the column with the particles and at the same time applying voltage to the electrodes to heat the used active carbon.

The particulate carbon flows in a substantially linear and vertical direction through the column and through the electrodes. Uniformity of current requires that the current flow and particle flow be parallel. Each electrode bridges (forms a continuous bridge with) the vertical walls of the column so that particulate carbon entering from the top can exit the column only by passage through the electrodes. There should be no gap between the periphery of the electrode and the vertical wall or walls of the column or, if such a gap exists, it should be so small that substantially none of the carbon can by-pass the electrode.

The term "used active carbon" used to describe the present invention means active carbon which has lost its activity through used and is synonymous with the term "adsorbed carbon" which has adsorbed materials on it.

DETAILED DESCRIPTION OF THE INVENTION

Figure 1:
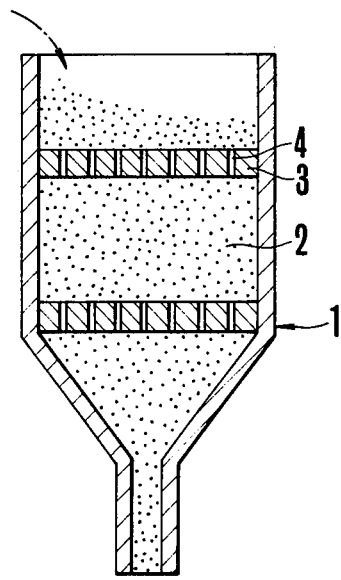
FIG. 1 is a schematic diagram illustrating one example of a vertical column for reclaiming the used active carbon according to the present invention.
Figure 2:
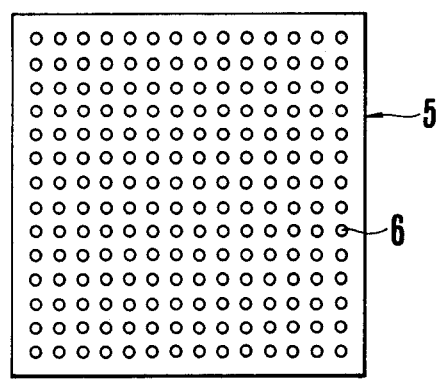
FIG. 2 is a plan view illustrating one preferred embodiment of one of the electrode plates which have a plurality of through-holes and which are disposed in the vertical column.
Figure 3:
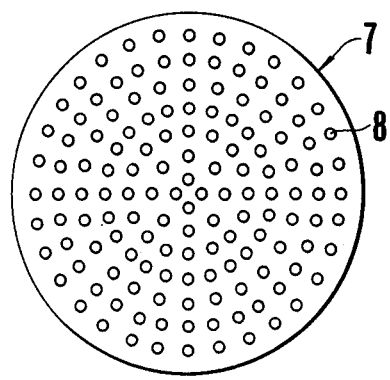
FIG. 3 is a plan view, similar to FIG. 2, but illustrating another preferred embodiment of one of the electrode plates.
Figure 4:
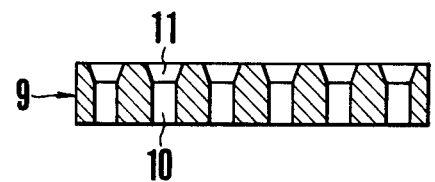
FIG. 4 is a sectional view of the electrode plate shown in FIG. 2 or FIG. 3, illustrating a preferred shape of the through-holes.
Figure 5:
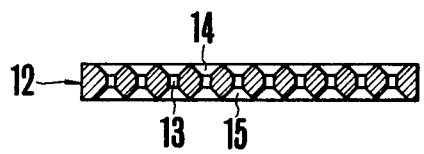
FIG. 5 is a view similar to FIG. 4 but illustrating another shape of through-holes.
Figure 6:
FIG. 6 is another view similar to FIG. 4, but illustrating an embodiment having a number of tubular extensions in communication with the through-holes.
Figure 7:
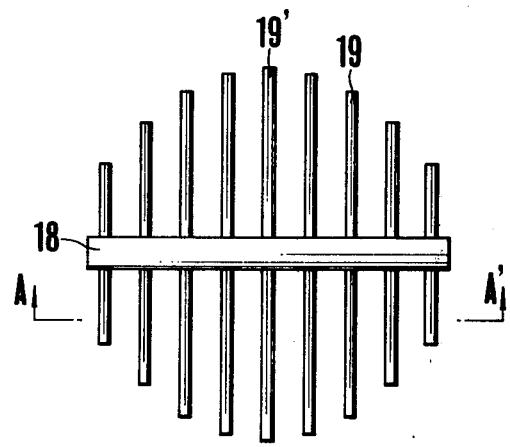
FIG. 7 is a plan view illustrating another preferred embodiment of the electrode plate.
Figure 8:
FIG. 8 is a cross-sectional view, taken along line A-A' of the electrode plate shown in FIG. 7.
Figure 9:
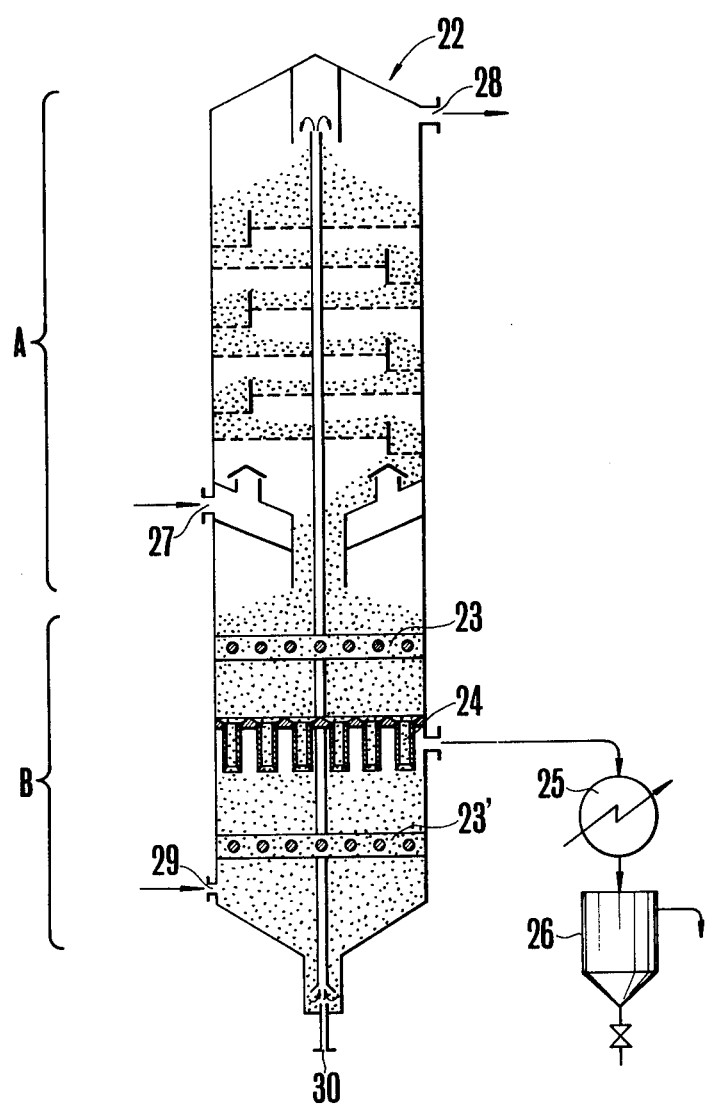
FIG. 9 is a schematic diagram illustrating one preferred embodiment of the present invention in which the used active carbon is continuously reclaimed.

The vertical column used in the present invention contains at least two electrode plates horizontally mounted in a spaced relationship, as shown in FIG. 1. The electrode plates are provided with a plurality of through-holes large enough to allow passage of the used active carbon particles therethrough. In FIG. 1, reference numeral 1 indicates a vertical column, 2 a used active carbon, 3 an electrode plate and 4 a through-hole. The electrode plate 3 is not limited to a particular shape but may be, for example, rectangular or circular as shown in FIG. 2 or FIG. 3. In FIG. 2, 5 denotes a rectangular electrode plate and 6 a through-hole. In FIG. 3, 7 denotes a circular electrode plate and 8 a through-hole. The through-holes may be anyone of a number of shapes. The through-holes, for example, may have tapered portions at their upper openings as shown in FIG. 4. Further, the through-holes may be tapered at both their upper and lower openings as shown in FIG. 5. In FIG. 4, 9 denotes an electrode plate and 10 a through-hole having taper 11 at its upper opening. In FIG. 5, 12 denotes an electrode plate and 13 a through-hole having taper 14 and taper 15 at the upper and lower openings, respectively. The electrode plates may have a number of hollow legs or tubular extensions on the underside thereof in communication with the through-holes, as shown in FIG. 6. Each of the legs ordinarily has a length on the order of 300mm. In FIG. 6, 16 denotes an electrode plate and 17 a leg in communication with the through-hole. The electrode plates having a number of hollow legs on the underside thereof in communication with the through-holes are preferred in the present invention, because they help make the vertical flow rate of the carbon through the electrode plate uniform across the plate. Further, one or more of the electrodes may be in the shape of a grille, as shown in FIG. 7. The electrode plate illustrated in FIG. 7 is composed of core bar 18 and a plurality of rods 19, 19'... which are installed on both sides of the core bar 18 and which are perpendicular to the core bar 18. FIG. 8 indicates the A-A' line cross-sectional view of the electrode plate shown in FIG. 7. In FIG. 8, 20 denotes a core bar and 21 a rod. The electrode plate having a number of hollow legs on the underside thereof in communication with the through-holes can also be used as a partitioning plate disposed between electrode plates arranged in the vertical column, as shown in FIG. 9 for facilitating the exhaustion of desorbed gas. In FIG. 9, 22 denotes a vertical column consisting of an adsorption section A (wherein the gaseous pollutants contained in a waste gas are adsorbed on an active carbon) and a regeneration section B (wherein the used active carbon is reclaimed). The regeneration section B is provided with electrode plates 23 and 23' of the grille shapes as shown in FIG. 7. Between plate 23 and plate 23', a partitioning plate 24 is disposed. In FIG. 9, 25 denotes a condenser, 26 a decanter, 27 an inlet for the waste gas to be treated, 28 an outlet for the purified gas, 29 an inlet for a gas (e.g. steam) capable of reactivating the used active carbon and 30 an inlet for a gas for lifting the reclaimed active carbon.

The method of the present invention has solved the problem of biased flow of electrical current encountered in prior art processes by applying the current in parallel with the particle flow.

Further, the method of the present invention heats the spent active carbon particles by passing same through a vertical column having at least a pair of vertically spaced electrode plates. The electrode plates are characterized by the presence of plurality of through-holes or apertures large enough for the particles of the absorbed carbon to pass through, the through-holes being uniformly distributed over the electrode plates. By applying a voltage to the electrode plates, an electric current is directly applied to heat the adsorbed carbon which has filled the space between the electrode plates and is continuously flowing downwardly. The method is further characterized in that the total area of the through-holes accounts for at least 25% of the total electrode surface area. The through-holes may have any cross-sectional shape.

The electric current generates heat in the particles by Joule heat produced mainly by the electrical resistance at the contact points between the particles. Accordingly, in order to obtain stable heat generation by applying an electric current, it is necessary to fully retain not only contact between the particles and the electrode plates but also contact among the particles. Further, in order to let the particles flow down and move through the column while retaining electrical contact, the total opening area of the through-holes may minimumly be 25%, but preferably more than 40% of the surface area of the electrode plates. It is preferred that the through-holes be uniformly arranged in the electrode plates. If the area of the through-holes is less than the above limit, cone-like cavities which correspond to the angle of repose of the particles tend to form, so that the electrical contact between the particles and the electrode plates becomes insufficient, causing electric current flow and heat generation to be non-uniform. On the contrary, if the through-holes are too large, it may occur that no electric current will flow in a part of the layer formed by the particles between the upper and lower electrode plates, causing the heat generation in the particles to be non-uniform. Further, such a tendency becomes conspicuous if the distance between the two electrode plates is too small. This problem can be reduced, for example, by making the lower end (the exit end for the particles) of the through-holes of a tapered shape having a wider angle opening than the angle of repose of the particles to avoid formation of cone-like cavities. Alternatively, rather than installing upper and lower electrode plates of identical shape in a symmetrical arrangement they may be installed in relative positions slightly removed from the symmetrical to improve uniformity of current flow. Basically, however, the problems of non-uniform current flow and heating can be solved by using flat plate-like electrodes in which the through-holes are large enough for the particles of the used active carbon to pass through and are uniformly arranged over the electrode plates, with the total area of the openings of the through-holes being at least 25% of the total surface area of the electrode plates.

By using electrode plates having the above-mentioned construction features, the present invention has attained a novel and stable process for continuously heating the used active carbon particles, which is free from the defects of prior art processes. That is, the present invention provides a very efficient process for heating the used active carbon by continuously applying an electric current to the electrode plates positioned perpendicular to the column through which the used active carbon flows. When voltage is applied to the electrode plates, the electric current flows in parallel with the flow of the particles, whereby the electric current is uniformly applied over the entire passage.

The present method is particularly effective for heating used active carbon particles having a spherical shape, due to the shape factor of the particles of active carbon. In the case of spherical carbon particles, the apparent electric resistance of the particles in the dense layer formed by the spherical particles between the plates exhibits a constant value with good reproducibility even under pressure, because the number of contact points among the particles, more specifically, contact point density, is constant. On the contrary, the apparent electrical resistance of crushed carbon or the like, exhibits comparatively wide variation, because the contact point density varies according to the manner of filling the column with the particles. Therefore, the reproducibility becomes poor, too. The spherical particles of used active carbon have stable resistance to the applied electric current, provide a stable flow and show less change in the charged condition. Therefore, from the technical and economical view-points, the use of spherical carbon particles is preferred.

In the process of the present invention, the heat treatment of the used active carbon by applying an electric current may be carried out in two heating stages: a pre-heating stage and a desorption heating stage. Alternatively, when several kinds of materials having different desorption temperatures are separately desorbed and recovered from the used active carbon, these materials may be recovered by controlling voltage applied to a plurality of electrode plates distributed in several stages.

According to the present invention, a very efficient compact apparatus can be used as a reclamation unit, for example, for use in continuous gas treatment applications utilizing active carbon.

Now, the present invention will be described more specifically below with reference to preferred embodiments. It should be noted that the present invention is not limited in any way to these examples.

EXAMPLE 1

Two grille shaped electrode plates (as shown in FIG. 7) were fabricated by installing at equal intervals eight carbon rods each having an outer diameter of 20 mm on opposing sides of a carbon bar measuring 50 mm + 50 mm in cross-section and 490 mm in length so that the carbon rods were perpendicular to the carbon bar. Two electrode plates thus fabricated were disposed at the upper and lower ends of a circular column having an inner diameter of 500 mm and made of hard glass. The distance between two electrode plates thus disposed was 900 mm. A partitioning plate of the type as shown in FIG. 6 was disposed between the two electrode plates. The partitioning plate was a circular carbon plate having an outer diameter of 490 mm and a thickness of 50 mm. The circular carbon plate had 37 through-holes each having a diameter of 60 mm arranged uniformly over the plate. Moreover, the circular carbon plate carried, attached to its lower surface, 37 hollow carbon legs which each had an inner diameter of 45 mm, an outer diameter of about 60 mm and a length of 300 mm, each leg attached as an extension of one of the through-holes. The gap between the partitioning plate and the inner wall of the column was stuffed with asbestos yarn. The column had a bottom in the shape of an inverted cone type funnel.

The particles (an average grain size of 750 $\mu$) of a used spherical active carbon containing carbon tetrachloride absorbed in an amount of 500 grams per 1 kg of active carbon were introduced into the column from the top at the rate of 150 kg/hour. Steam was introduced into the column from a nozzle provided at the bottom, which steam served as a carrier for the transportation of the desorbed components.

The space between the partitioning plate and the upper electrode plate was utilized as a preheating section. The space between the partitioning plate and the lower electrode plate was utilized as the desorbing section. A voltage was applied to the upper and lower electrode plates and controlled so as to maintain a temperature of 130° C. at the middle of the desorbing section.

The used active carbon was preheated in the preheating zone and flowed down into the desorbing section through the 37 through-holes and hollow carbon legs in the partitioning plate. Then, the used active carbon was brought into counter-current contact with the steam rising from the bottom of the column to strip the adsorbed organic material from the carbon, the stripped organics exiting with the stream through the desorbing section.

The amount of carbon tetrachloride remaining adsorbed on the reclaimed active carbon discharged from the column bottom was less than or equal to 30 g per 1 kg of reclaimed carbon.

EXAMPLE 2

Grille-shaped electrode plates were fabricated by installing at equal intervals 5 carbon rods, each having an outer diameter of 15 mm, on opposing sides of a carbon bar measuring 40 mm × 40 mm in section and 250 mm in length so that the carbon rods were perpendicular to the carbon bar. One of the electrode plates thus fabricated was disposed in the lower end of a square column made of hard glass. The square column had a height of 600 mm and each interior wall measured 250 mm across. Another similar electrode plate was disposed 250 mm above the top of the first-mentioned electrode plate. The column had a bottom having a shape of an inverted pyramid type funnel.

The particles (an average grain size of 700 $\mu$) of a used spherical active carbon containing carbon tetrachloride adsorbed in an amount of 450 grams per 1 kg of active carbon were introduced into the top of the column at a rate of 100 kg/hour. An alternating current of 100V was applied to the above-mentioned electrode plates. When the temperature in the center of the desorption part of the column reached 130° C., a valve, provided in the funnel-like bottom of the column, was opened to permit particle flow and simultaneously, steam was introduced into the column from a nozzle provided at the bottom, the steam serving as a carrier gas for the transportation of the desorbed components.

The amount of undesorbed carbon tetrachloride in the reclaimed active carbon discharged from the bottom of the column was less than or equal to 30 g per 1 kg of reclaimed carbon. For comparison, the same electrodes as used in the above-mentioned reclamation experiment were installed on opposite walls inside the square column. The same experiment was repeated by applying a voltage of 100V to these electrodes to heat the particles in such a way that an electric current was applied to the particles at the right angle to the flow of the particles. The amount of undesorbed carbon tetrachloride in the resulting reclaimed carbon was 85g or more per 1 kg of active carbon.

The teachings of applicants' copending application, U.S. Ser. No. 678,959, filed Apr. 21, 1976 are incorporated herein by reference.

What is claimed is:

1. A method for reclaiming particulate used activated carbon which comprises:
    (a) providing a vertical column containing at least two electrodes mounted in a vertically spaced relationship, said electrodes being provided with a plurality of openings large enough to allow passage of the used active carbon particles therethrough and having a total area at least 25% of the total surface area of said electrodes, said electrodes bridging the vertical walls of said column so that substantially all carbon entering from the top must pass through the electrodes;
    (b) introducing the used activated carbon into the top of said column above the upper electrode and allowing the used activated carbon to flow downwardly through said electrodes filling the space between said electrodes thereby providing electrical contact between the particles and between the particles and the electrodes;
    (c) applying a voltage potential between said electrodes thereby causing an electric current to flow through and thereby heat the particulate carbon between said electrodes; and
    (d) removing said particulate carbon from the column at a point beneath the lower electrode.

2. The method of claim 1 wherein said openings are uniformly distributed over said electrode.

3. The method of claim 1 wherein said used active carbon is spherical.

4. The method of claim 1 wherein at least one of said electrodes is in the form of a plate which carries a number of hollow legs on its lower surface, said legs being in communication with and extending from said openings and being large enough to allow passage of the used active carbon particles therethrough.

5. The method of claim 1 wherein said electrodes are rectangular or circular plates.

6. The method of claim 1 wherein at least one of said electrodes is in the shape of a grille composed of a core bar and a plurality of rods attached perpendicularly to both sides of said core bar.

* * * * *